INVENTOR.
GEORGE W. JACOBS

INVENTOR.
GEORGE W. JACOBS
BY
Marshall, Wilson & Yeasting
attorneys

INVENTOR.
GEORGE W. JACOBS
BY
Marshall, Wilson & Yeasting
— attorneys —

United States Patent Office 3,428,148
Patented Feb. 18, 1969

3,428,148
CONVENTIONAL ELEVATOR CONTROL WITH ADDITIONAL MEANS TO SELECTIVELY LOCK OUT FLOORS
George W. Jacobs, New Hyde Park, N.Y., assignor, by mesne assignments, to The Reliance Electric and Engineering Company, Cleveland, Ohio, a corporation of Ohio
Filed Feb. 4, 1965, Ser. No. 430,442
U.S. Cl. 187—29     11 Claims
Int. Cl. B66b *1/44, 3/02*

ABSTRACT OF THE DISCLOSURE

A control for an elevator which is actuated when the elevator is effectively at a given position in its travel and the conventional position responsive controls have been altered for said given position. In one embodiment a car is prevented from stopping at a floor and cancels calls for the floor as it passes when a lockout control for the floor is established through the circuits of the floor selector machine of the car which normally control the car's position indicator. The impedance of the position indicator circuit for a floor is altered to provide the lockout by energizing a lockout control relay which is insensitive to the completion of the normal position indicator circuits and responsive to the completion of the circuit with the altered impedance.

---

This invention relates to controls for elevators and more particularly to controls which are responsive to the position of an elevator. It has been illustrated below as utilized to prevent access through one or more elevators to one or more given landings by actuating lockout mechanisms when the elevator is in position and condition to otherwise serve said landings. However, it is to be appreciated that the position responsive control is useful for other purposes such as actuating special signals such as message announcing systems to selectively issue announcements as a car attains an appropriate position or other functions requiring the alteration of circuits selectively while a car is in a given position.

Heretofore it has been known to commutate the circuits of an elevator system in accordance with the position of an elevator car. In general such commutation has been performed by mechanical devices known as floor selectors which carry one or more brushes over a path relative to a series of contacts in an array corresponding to the travel path of the elevator car. Another form of commutation has been by means of a chain of relays or switching elements which are actuated in succession according to car position. In both of the above commutating schemes, it sometimes occurs that there are insufficient contacts for the number of circuits to be commutated.

Existing elevator systems sometimes require the addition of equipment which utilizes car position in its operation. Ordinarily such systems are not provided with extra commutated circuits and substantial inconvenience and expense is incurred if additional commutated circuits are provided.

An object of the present invention is to avoid the aforenoted difficulties by simplifying the electrical circuits required for a commutated control correlated to elevator car position.

Another object is to reduce the expense of supplemental commutated circuits while maintaining a high reliability for commutated electrical circuits.

A further object is to enable commutated circuits to be conveniently and expeditiously added to existing elevator controls.

A fourth object is to improve floor lock outs for elevator systems.

In accordance with the above objects, one feature of this invention resides in utilizing a commutated circuit or series of circuits in a dual function wherein different impedance values can be sensed through common portions of the circuit and controls actuated for each function in accordance with the impedance levels.

Another feature involves utilizing existing commutated circuits which are commutated according to the effective position of an elevator car in an elevator system to perform the function for which they were originally designed and by selectively altering the impedance of one or more such circuits causing other functions to be performed according to car position. In particular a control device responsive to distinct impedance levels is commutated to the circuit without detrimentally affecting the original or primary function. The control device is arranged to be non-responsive to one impedance level and to respond when it is commutated to the altered impedance level.

A third feature is to utilize a readily available relay which has little effect on a position indicator circuit for an elevator when connected to that circuit as a lock out control which prevents service by the elevator when it is effectively at a landing having a position indicator circuit with a reduced resistance. Such reduction in resistance can be achieved by shunting the position indicator lamp for that landing.

A fourth feature involves providing landing lockout functions for an elevator car which is otherwise fully operative by rendering the car stopping controls non-responsive to registered calls for the landing which is locked out while they remain fully responsive to calls for other landings. As an adjunct to this feature the call registration devices for a locked out landing are reset when the car is in the vicinity of the locked out landing even though the car cannot stop. This reset occurs only for the locked out landing and calls for all other landings are not reset until they have been served.

As applied in the illustrative embodiment set forth below, a selectively actuated floor lock out system is established through the position indicator circuits of an elevator system. This lock out system is controlled by a restricted access switch for each landing to be locked. The switch is connected across the position indicator lamp for the landing to be locked, which is operated by the position of the car. Such lamps are usually displayed at a main landing of the elevator system. The circuit commutated for the lamps by the car position includes a relay which is so rated that it cannot be pulled-in by the current passed through it to the position indicator lamp but which will be pulled-in if the position indicator lamp is shunted by the limited access switch. Thus, each time the car enters a region of travel associated with a locked out landing, the lockout relay for that car is actuated and conditions the system so that the car cannot be stopped by car and hall calls and so that if the car is stopped at the landing, as by operation of emergency circuits, the doors will not be opened.

The above and additional features of this invention will be appreciated more fully from the following detailed description when read with reference to the accompanying drawing in which.

The present invention is applicable to elevator systems of many forms including single and multi-car systems. In the present illustration only a single car serving seven landings is shown. However, the car represents only a portion of a multi-car system in which the invention can be applied to each car in the manner illustrated. Thus certain cross connections between cars and group supervisory controls are shown.

In order to reduce the illustration of the salient features, only portions of the control circuits have been shown. Thus the car and hall call buttons and relays have been shown only for the terminal and adjacent landings. The controls have been illustrated for the car located at the sixth landing so that the several floor selector brushes are completing circuits for the sixth landing. Where plural car systems are employed, certain of the control circuits are connected in parallel at points indicated by arrow headed leads as in FIGS. 4 and 5.

To facilitate location and to provide a short description of each of the relay and switch functions Table A is below provided as a key or index to the relay coils appearing in the drawings. As an aid in determining the function of relay contacts whose coils are not shown in the accompanying drawings Table B is set forth to provide in alphabetical order the names of the relay coils having contacts only in the accompanying drawings.

The relays and switches and all other components illustrated are shown in across-the-line diagrams. Their contacts therefore are often located remote from the actuating coils. In order to illustrate the relationship and location of actuating coils and contacts a marginal key has been employed with each circuit diagram whereby the circuits are divided into horizontal bands which are identified by line numbers in the right-hand margin of the figure. Relay symbols are located in the margin to the right of the key numerals and in horizontal alignment with the relay actuating coil positions. Each contact actuated by a relay coil is designated to the right of the relay symbol by the numeral of its line location. Back contacts, those which are normally closed when the relay armature is dropped out and are opened when the actuating coil is energized, have their line numbers underlined in the key to distinguish them from front contacts, those which are closed upon the coil being energized. Thus, for example, down generator field relay DF has its actuating coil located in line 7 of FIG. 1 and when energized closes its front contacts at lines 1 and 2 of FIG. 1, respectively designated in the margin as 1 and 2 and opens its back contacts at line 5 of FIG. 1 designated in the margin by 5.

Each contact is also labeled with the symbol of its actuating means and is illustrated in the condition it assumes while its armature is dropped out so that the front contacts of the down generator field relay are shown as open in lines 1 and 2 and are labeled DF while the similarly labeled back contact in line 5 is shown closed.

In Table A the line location of the actuating coil for each relay is set forth in the right hand column as follows:

TABLE A

| Symbol: | Name | Line Location |
|---|---|---|
| BK | Brake Relay | 6 |
| BP | By Pass Relay | 48 |
| CL | Door Closing Relay | 44 |
| CS | Car Start Relay | 9 |
| DF | Down Generator Field Relay | 7 |
| DL | Down Signal Direction Relay | 12 |
| G | Gate Relay | 8 |
| LD | Down Leveling Relay | 11 |
| LO | Lockout Relay | 72 |
| LU | Up Leveling Relay | 10 |
| OP | Door Opening Relay | 43 |
| RB | Car Button Reset Relay | 15 |
| RC | Retiring Cam Relay | 19 |
| RL | Direction Throwover Switch | 15, 16 |
| TC | Top floor, car call relay | 31, 32 |
| S | Landing Signal Stopping Relay | 63 |
| SC | Stopping Sequence Relay | 40 |
| S2D | 2nd Landing Call Down | 54 |
| S6D | 6th Landing Call Down | 52 |
| STD | Top Landing Call Down | 50 |
| S1U | 1st Landing Call Up | 59 |
| S6U | 6th Landing Call Up | 57 |
| UF | Up Generator Field Relay | 5 |
| UL | Up Signal Direction Relay | 13 |
| V | Advance Motor Stopping Relay | 34 |
| 1C | 1st floor, car call relay | 38, 39 |
| 6C | 6th floor, car call relay | 34, 35 |

TABLE B

| | Name |
|---|---|
| Symbol: | |
| CDD | Down Dispatch Relay. |
| CUD | Up Dispatch Relay. |
| EM | Emergency Relay. |
| F | Failure Relay. |
| GS | Group Service Relay. |
| HLD | Hatchway Actuated Leveling Contacts. |
| HLU | Do. |
| LR | M-G Set Run Switch. |
| MG | Bottom Dispatching Floor Relay. |
| MG1 | Top Dispatching Floor Relay. |
| RH3 | Rheostat Contact. |
| TR | Start Time Relay. |
| VR2 | Advance Motor Stopping Relays. |

Figure 1:
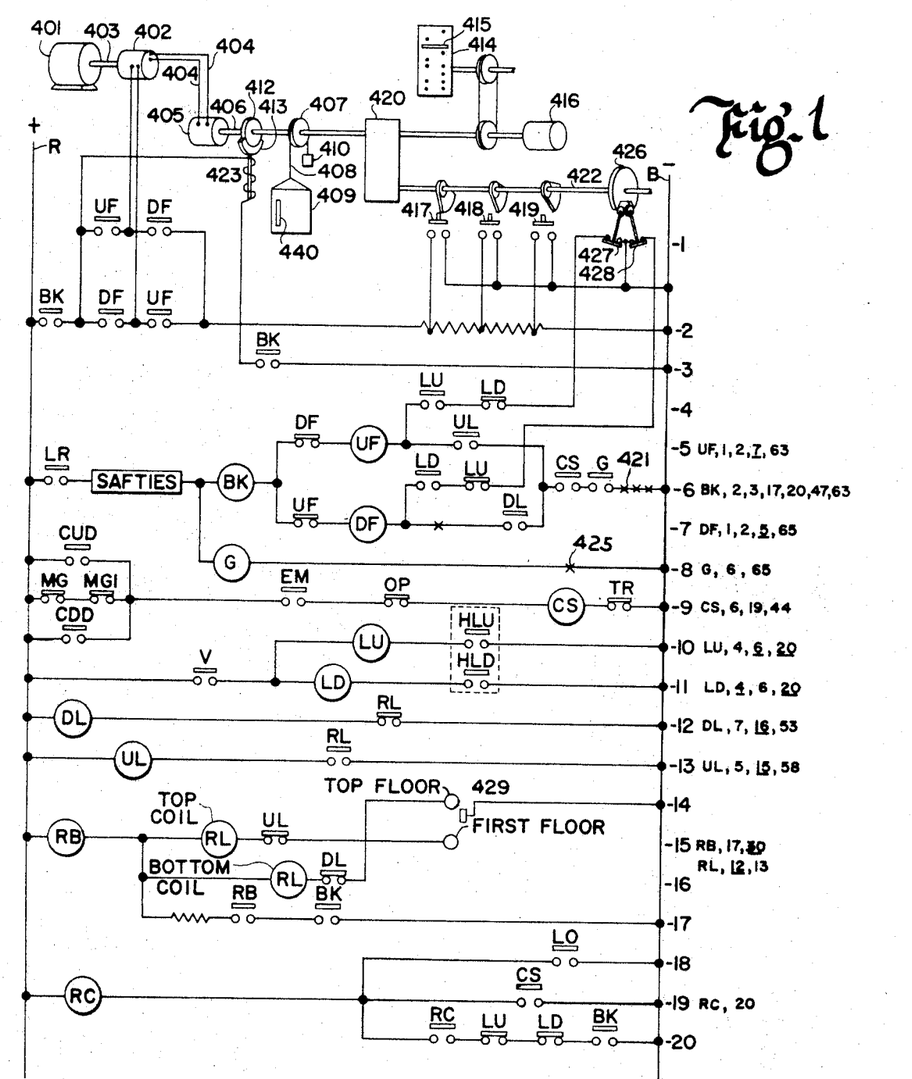
FIG. 1 is an across the line wiring diagram of typical elevator car controls to which the present invention can conveniently be applied and includes a diagrammatic representation of the hoist motor, power source, elevator car, brake floor selector and hoist motor control.

*Description of FIG. 1*

For purposes of illustrating this invention it has been applied to elevator car controls wherein the lifting motor is of the D.C. type and is supplied from a generator. As schematically represented, a motor 401, drives the D.C. generator 402 through shaft 403. The generator 402 is coupled through its output leads 404 to a D.C. lifting motor 405. The armature shaft 406 of the lifting motor is coupled directly to the sheave 407 over which the cables 408 supporting the elevator car 409 and its counterweight 410 are trained. A brake drum 412 is secured on shaft 406 and is provided with a spring applied and electromagnetically released shoe 413. Operation of the several control circuits in accordance with effective car position is actuated through a commutating device commonly identified as a floor selector 414 comprising vertical columns of contacts or segments commutated by brushes mounted on the crosshead 415 moving along those columns. In the particular arrangement chosen for illustration the floor selector 414 advances the crosshead with respect to the actual position of the car as represented on the selector 414. The floor selector contact array simulates a miniature elevator hatchway wherein the contacts are located at floor levels in aligned rows for the several circuit functions to be actuated when the car is effectively at a given level and the crosshead carries the brushes to those levels. While the car is stopped the crosshead is at the same effective position on the array as the car is in the hatchway so that the stopping of the car at the sixth landing stops the crosshead on the floor selector to enable circuits for the controller for the sixth landing. When starting the car, the crosshead is driven at an essentially constant speed ahead of the car by an advance motor 416 whereby it moves in advance of the actual position of the car as represented on the floor selector contact array. Thus, when the crosshead encounters a contact indicating the presence of a call for which the elevator is to stop, the advance motor is deenergized to stop the crosshead and the car continues to move to the floor represented by the crosshead position. Slowdown controls operate as the car approaches that floor through a series of rheostat connections made through cam actuated contacts represented by contacts 417, 418 and 419. These contacts control the voltage applied to the shunt field of the generator 402 in accordance with the system disclosed in J. H. Borden Patent No. 2,685,348 which issued Aug. 3, 1954, for "Elevator Control Systems," wherein the advance motor 416 and the lifting motor 405 jointly drive a differential 420 to control the cam shaft 422 and thus the contacts in the series field rheostat.

Direct current supplies the main leads R and B of FIG. 1. Operation of the car is controlled initially by a car starting relay CS at line 9 when the car is not at a dispatching terminal and lower dispatch terminal relay MG and upper dispatch terminal relay MG1 are de-energized to close their contacts at line 9, or the car is at one of the dispatching terminals and the system dispatch relay CUD for up dispatching or CDD for down dispatching at lines 8 and 10, respectively, have been energized. In addition, the emergency circuits must be energized to close the contact EM, the doors of the car must not be opening so that door opening relay contacts OP are closed, and the start time relay TR must have timed out and closed its contact. Upon energization of relay CS it closes its contacts at line 6 which in conjunction with closed gate contacts 425 for gate relay G and the closed landing interlock switches 421 enables the generator field relays UF or DF and the brake relay BK to be energized and thereby release the brake holding the car at the floor and initiate the operation of the lifting motor 405.

Although not shown herein reference is made to the Walter A. Nikazy Reissue Patent No. 25,665 of Oct. 20, 1964, entitled, "Variable Standing Time Control," for circuits which are directed to the initiation of operation of the start time relay contacts TR in line 9 controlling operation of the car starting relay CS.

So long as the MG set is running contact LR at line 6 is closed. If the up signal direction relay UL is energized at line 13 through the closure of contact RL of direction throwover switch RL, up generator field relay UF at line 5 is energized through contacts UL at line 5 and brake relay at line 6 through the safety contacts in the motor generator run relay contacts LR at line 6 to lead R. Conversely, the motor can be set to lower the car by the operation of its down generator field relay DF at line 7 if contact DL at line 7 is closed by virtue of the resetting of the direction throwover relay RL to energize down signal direction relay DL at line 12. If the brake relay is energized to close its contacts at lines 2 and 3, brake relay solenoid 423 is energized to lift the brake shoe 413 from the brake drum 412 on the motor armature shaft. At this time, assuming that the up signal direction has been set an up generator field relay UF is energized, contact UF at lines 1 and 2 are closed to energize the generator series field with a polarity to cause the lifting motor 405 to drive the armature shaft in a lifting direction. Advance motor 416 is started at this time (by means not shown) to drive the crosshead 415 and differential 420 in the direction the car is set to travel. This imposes an accelerating voltage on the generator 402. The car therefore runs from the floor following the previously advanced crosshead 415 until the crosshead 415 picks up a stopping signal from one of the rows of contacts on the floor selector machine 414. Gate relay G appears at line 8 together with its gate limit contacts 425 which is closed when the gate is fully closed on the car.

Up leveling and down leveling relays LU and LD are shown at lines 10 and 11. These relays are enabled upon the pick up of a stopping signal through the closure of contact V, at line 11 as will be described, and are pulled in when their circuits are completed by the closure of the contacts HLU and HLD in the leveling units. These leveling units are mounted on the car and are magnetically actuated by being carried with the car into the range of magnetic influence of vanes positioned adjacent the respective landings in the hatchway along which the car travels. Thus, as a car enters the leveling zone during an ascent contact HLU is first closed by the entry of its actuating unit into the range of magnetic influence of the stationary vane in the hatchway and when the car is level with the floor the HLU contact opens to deenergize the leveling relay LU. Similarly, if the car is descendng the contact HLD first enters the range of influence and the relay LD is energized. While the car is level with the floor, the vane is positioned betwen the units HLU and HLD and both contacts are open so that both relays LU and LD are deenergized.

By reference to lines 4 and 6 it will be appreciated that with the leveling unit operative, when the car sinks below a proper leveling condition at a landing, contact HLU is pulled in by the movement of its actuating unit into the range of magnetic influence of the vane to pull in relay LU and close its contacts at line 4. If the rheostat shaft 422 has returned to its neutral or stopped position, cam 426 permits contacts 427 and 428 to close and closed contact LU and line 4 completes an energizing circuit for the up generator field relay UF through the normally closed rheostat actuated contact 427 to energize relays BK and UF and cause the car to relevel. If the car is above the floor, the contact HLD is similarly closed to energize down leveling relay LD and close its contact at line 6, whereby the down generator field relay DF is energized and the lifting motor is caused to lower the car.

One column of floor selector contacts engaged by a brush 429 mounted on the crosshead 415 is shown at lines 14 and 15. The floor selector machine contact located in line 15 represents the contact located at the lower limit of travel of the car. The contact located in line 14 represents a position corresponding to the top landing at the upper limit of travel. Thus, when the crosshead is at the upper limit of travel at line 14 brush 429 engages the top floor contact to energize the bottom coil of the direction throwover switch RL in line 16 to close contact RL in line 12. Closure of contacts RL in line 12 energizes down signal direction relay DL. Similarly, when the crosshead is at the first floor level contacting the "first floor" contact in line 15 the top coil of the direction throwover switch RL in line 15 is energized. The energization of the top coil of the direction throwover switch RL in line 21 is operative to close RL contacts in line 13 while opening RL contacts in line 12. Thus, the closing of contacts RL in line 13 is operative to energize the up signal direction relay UL in line 13.

As will be noted energization of either the top or the bottom coil of the direction throwover switch RL will be operative to energize car button reset relay RB in line 15. Energization of the car button reset relay RB will, through the opening of its contacts RB in line 30 of FIG. 2 reset all of the car calls registered in the car upon reversal of direction by the car. Closure of contacts RB and contacts BK in line 17 operate as a seal-in circuit to insure that all of the car buttons have time to reset after the car button reset relay RB in line 15 has been energized. When the car starts movement again the brake relay contacts BK will open deenergizing relay RB.

For more detailed information on the control circuits of an elevator system operative to provide the service in which this invention may be employed, reference is made to application Ser. No. 808,290, filed Mar. 30, 1959, entitled, "Elevator Controls," by Raymond A. Burgy.

Figure 7:
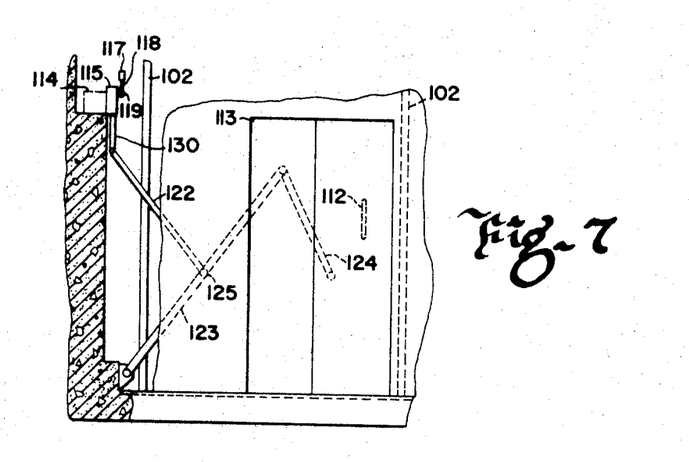
FIGS. 7 and 7A are schematic drawings of an elevator landing and the exterior of an elevator car showing the relative orientation of the door operating equipment.
Figure 7A:
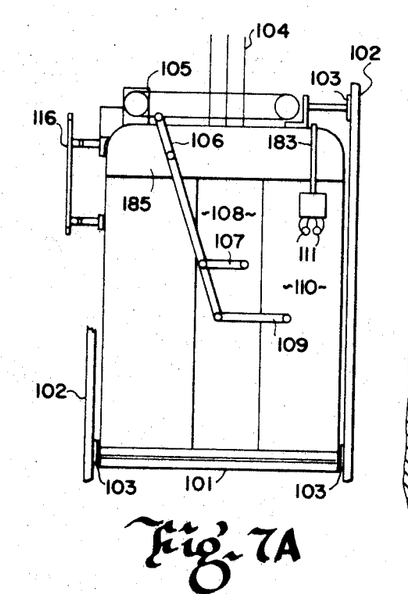
Figure 8:
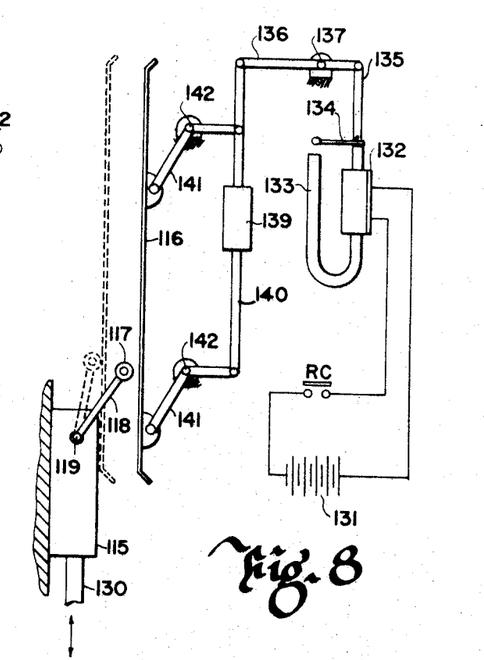
FIG. 8 is a drawing of the mechanical interlock which controls the release of the landing door of FIG. 7.

Retiring cam relay RC at 19 controls a mechanical interlock release shown in FIGS. 7, 7A and 8. When it is energized the interlock cannot be released. While the elevator car is running between landings and past landings at which it will not stop, the retiring cam relay remains energized. It is deenergized when it enters the leveling zone for a landing at which the car is to stop. The floor lockout features of this invention include holding the retiring cam relay energized when in the vicinity of a landing which is to be locked out by closing contact LO at 18. For a normal run, to a landing, contacts LO at 18 and CS at 19 are open and a circuit holds relay RC through contacts RC, LU, LD and BK at 20. As the car enters the leveling zone either LU or LD at 20 opens to drop relay RC. During a stop at a landing, relay RC remains deenergized since contacts RC and BK at 20 are open. When a start signal is issued, car start relay contact CS at 19 closes to energize relay RC and when the car and landing doors are closed, the interlock is made up. At this time relay V is deenergized to open contact V at 11, deenergize relays LU and LD and maintain contacts LU and LD closed as the car moves across the leveling zone. The brake relay BK is energized to close contact BK at 20 and contact RC at 20 seals relay RC. Start Time Relay TR is reenergized as the car starts to open contact TR at 9, drop relay CS and open contact CS at 19 so that the retiring cam relay circuit is again conditioned for a stopping operation.

Figure 2:
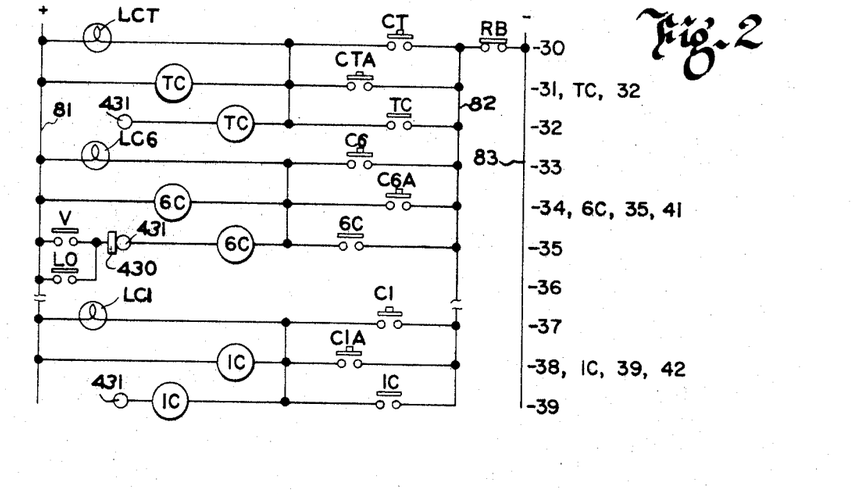
FIG. 2 is an across the line wiring diagram of fragments of a typical car call circuit suitable for employment with this invention.

Description of FIG. 2

FIG. 2 represents typical car call registration circuits. Two groups of car call buttons are available to passengers in the car. Each group contains a button actuated switch for each landing served by the car. The main group is designated by a C prefix and the landing designation as CT for the top landing and 1C for first landing. The auxiliary group is similarly referenced and has an A suffix. Indicator lamps, designated by an LC prefix and the landing number, are lit when a car call is in registration. These lamps are conveniently within the car call buttons in the car.

Two coils are employed for each car call; the upper is a set coil and the lower a reset coil. They are designated by the landing number and a C suffix. Closure of either car call contact as C6 or C6A energizes set coil C6 at 34 from lead 81 through lead 82 and back contact RB to lead 83 and a suitable source of direct current. Once registered, a car call relay is sealed by holding its set coil energized as through contact 6C at 35. Calls are reset as they are answered by the engagement of floor selector brush 430 with floor selector contact 431 for the landing to energize the reset coil of the car call relay. Thus when the car is set to stop at the sixth landing, advance motor stopping relay V is energized to close contact V at 35 and provide a circuit from lead 81. Energized reset coil 6C drops relay 6C and opens the seal contact at 35. Car calls are all reset at each reversal of the car by the opening of car button reset relay back contact RB at 30.

Another aspect of the floor lockout feature of this invention is the cancellation of car calls for a locked out floor as the car runs to or past the floor. This is accomplished by contact LO at 36 which closes a circuit from lead 81 to car call reset brush 430 even though the car is not slowed for a stop at the locked out landing and contact V at 35 remains open as the floor selector crosshead passes the landing position.

Figure 3:
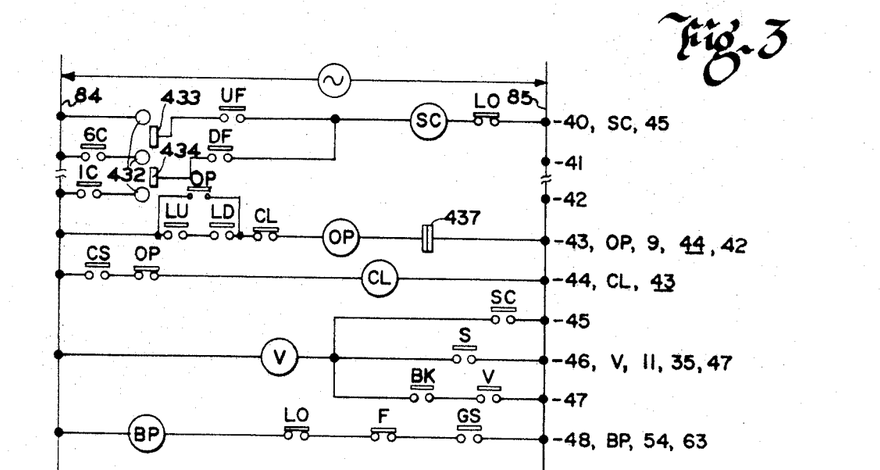
FIG. 3 is an across the line wiring diagram of fragments of a typical car call pick up circuit, door controls, car stopping controls and by-pass relay controls as combined with the present invention.

Description of FIG. 3

Car call stopping circuits, the door opening and closing circuits, slowdown initiation and the bypass circuits are shown in FIG. 3. A suitable source of alternating current supplies leads 84 and 85.

Stopping sequence relay SC at 40 is energized to initiate the stop of the car in response to car calls. When a car call is registered the car call stop floor selector contact 432 for the landing of the call is activated, as at 41 through contact 6C for a sixth floor car call. The floor selector crosshead 415 is provided with an up and down advance brush 433 and 434 for car call stops. Each of these brushes are offset from the crosshead so that they engage the contacts 432 before the crosshead reaches the landing position. An ascending car engages up brush 433 with contact 432 and through its up generator field relay contact UF at 40 energizes relay SC while a descending car engages down brush 434 with contact 432 and energizes relay SC through down generator field relay contact DF.

An aspect of the floor lock out feature of this invention whereby the car is prevented from responding to car calls for a locked out landing is provided by lockout relay back contact LO at 40. As will be described, when the crosshead 415 approaches a landing position on the floor selector 414, it energizes lockout relay LO. This opens the circuit for stopping sequence relay SC by opening back contact LO at 40 so that no slowdown and stop of the car can be initiated from the car call controls during the period the car is effectively in the vicinity of the locked out landing.

Relays OP and CL control the motor for the door operator of the car (not shown). Door opening relay OP at 43 is energized to initiate the opening of the car gate and hatchway door as the car is about six inches from the floor at which it is to stop. In the stopping sequence leveling relays are activated and at the six inch position both relays LU and LD or corresponding leveling relays close their contacts at 43 to energize relay OP which seals itself at 42. Relay OP remains energized during the opening of the doors and gate through the normally closed contact of door closing relay CL at 43 and is deenergized as the door approaches its fully open position and opens its normally closed limit contacts 437 at 43. Door closing relay CL at 44 is actuated by operation of car starting relay CS to close contacts CS at 44 provided the door open relay has been deenergized by having the door fully opened to cause the closing of back contacts OP at 44.

Advance motor stopping relay V at line 46 controls advance motor 416 to stop the advance of floor selector crosshead 415 when a stopping signal has been picked up on either the landing or car call circuits. In actual practice, relay V is energized only briefly and subsequent relays in the stopping sequence are held until the car is brought to a stop. However for purposes of simplifying the disclosure the functions of some of these subsequently operated relays have been merged in relay V and a seal is shown for that relay at 47 wherein contact V holds even though the initiating car or hall call has been cancelled. This seal is broken when the brake sets and brake relay BK is dropped to open contact BK at 47. Initiating operation of relay V by a landing call is accomplished by the operation of landing signal stopping relay S and the closure of contact S at 46, to be described. Pickup of a car call energizes relay V by closing stopping sequence relay contact SC at 45. Relay V initiates the slowdown by stopping the advance motor and enabling the leveling switches through contact V at 11. It also resets the car call at the stop by closing contact V at 35.

Figure 5:
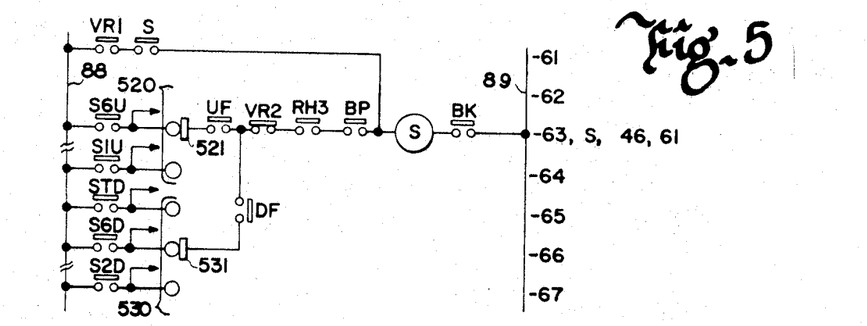
FIG. 5 is a fragmentary hall call pick up circuit in across the line form.

Bypass relay BP at 48 when deenergized prevents the pickup of hall calls by opening contact BP at 63 of FIG. 5. It is deenergized upon the occurrence of certain failures which open failure relay contact F at 48 and when the car is not in group service and group service relay contact GS is open. In the present invention the floor lockout feature utilizes relay BP to prevent response of a car to landing calls for floors which have been locked out by opening back contact LO at 48. This prevents energization of relay BP during the interval the elevator is effectively in the vicinity of the locked out floor.

Figure 4:
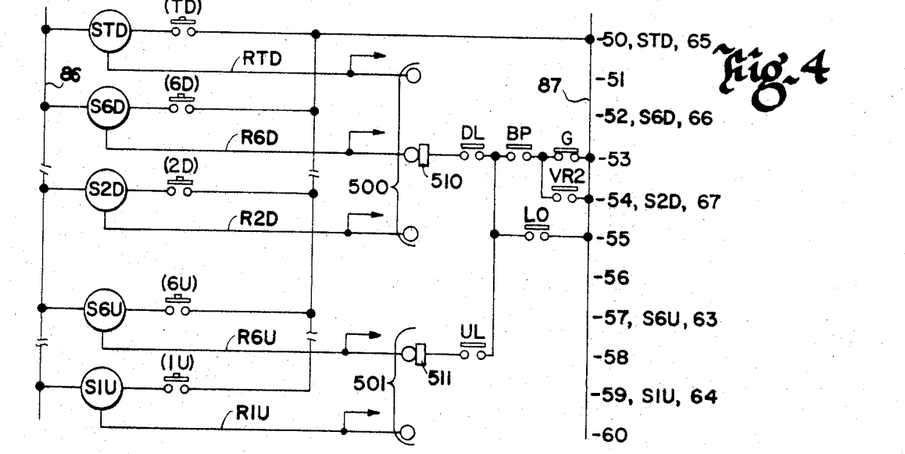
FIG. 4 is a fragmentary hall call registration and cancellation circuit employing the invention and portrayed in across the line form.

Description of FIG. 4

FIG. 4 illustrates, in an across-the-line diagram, circuits for energizing landing call relays for up hall calls and down hall calls and means for resetting these relays as the calls are answered. In lines 50 to 56 there is represented fragmentarily down landing call registering circuits including down landing call relays STD, S6D and S2D in lines 50, 52 and 54, respectively. Push buttons TD, 6D and 2D are associated with each of the respective down landing call relays and when closed will energize their respective associated relays. It is to be noted that both the up and down landing call relays are of the magnetic latch variety. In the diagrams magnetic latch relays are depicted as having three leads extending from the circle in which the reference character is located. The two leads extending horizontally are the terminals of the energizing or pull in coil while the horizontal lead extending from the left and the vertical lead constitutes a reset or canceling coil. Thus, as described above, closure of one of the push button contacts at the landings such as contact TD will energize down landing call relay STD, magnetically latching its contacts in the energized position even though the push button TD is opened after the coil STD has been energized. The down landing hall call magnetic latch relays are reset when their reset leads RTD, R6D and R2D which are connected to contacts 500, mounted on the floor selector machine 414 at the proper representative floor rows, are contacted by brush 510. Brush 510 in line 53 operates to reset the down landing call relays if the car is traveling in a down direction and the down signal direction relay contacts DL are closed, if the descending car is not set to bypass thus its bypass relay contacts BP are closed and if the gate relay contacts G are closed, all in line 53. It may be noted that advance motor stopping relay contacts VR2 are in parallel with the gate relay contacts G thus allowing the resetting of the down landing call relays STD through S2D if the VR2 contacts in line 54 are closed.

Similarly, up landing call relays S6U and S1U are located in lines 57 and 59 and are actuated by push buttons 6U and 1U located at the respective landings. Reset leads R6U and R1U are connected to contacts 501 on the floor selector machine 414 at the floor positions analogous to the contacts 500 above. Brush 511 on the crosshead of the floor selector machine 414 contacts the contacts 501 and through the respective reset leads will reset the up hall calls registered by the various relays provided the car is set to travel upward thereby having its up direction signal relay contacts UL in line 58 closed, is not set to bypass therefore having bypass contacts BP closed and gate relay contacts G closed in line 53.

The lockout feature of this invention is applied to the landing call reset circuits to insure reset of landing calls at floors which are locked out even though the car is not slowed, the gate is not opened, and the bypass relay is deenergized. Lockout relay contact LO at 55 is closed while the car effectively is in the vicinity of the landing and relay LO is energized so that up calls are reset through a path from leads 86 and 87 connected to a suitable source through the reset leads, contacts 501, brush 511, up signal direction relay contact UL at 58 and closed contact LO at 55. In a similar manner down landing calls at a floor which is locked out are reset through contacts 500, brush 510 and down signal direction relay DL at 53.

Description of FIG. 5

Typical sections of the hall call stopping circuits are shown in FIG. 5. These circuits are connected across a suitable source such as 220 volts single phase connected to leads 88 and 89.

A column of contacts 520 located in lines 63 and 64 are located on the floor selector machine 414 and are energized through contacts S6U and S1U of the up landing call relays illustrated in lines 57 to 60 of FIG. 4. Brush 521 carried on the crosshead 415 of the floor selector machine is operative to contact one of the contacts 520 and to energize the landing signal stopping relay S in line 63 when one of the up landing call relay contacts are closed, provided the up generator field contacts UF of the lifting motor are energized, that a stopping sequence has not been yet initiated so that VR2 contacts are closed, provided a predetermined speed is set and RH3 contacts on the cam operated rheostats are closed, provided that the car is not bypassing and its bypass contacts BP are closed, and provided that the brakes are not set so that the BK contacts are closed. Energization of the landing signal stopping relay S at line 63 closes contacts as described earlier in line 46 to energize the stopping sequence relay SC and closes contacts S in line 61 to provide a seal-in circuit for the relay S when the advance motor stopping relay contacts VR1 are closed.

Similarly, down landing call contacts STD, S6D and S2D in lines 65, 66 and 67 energize respectively one of the column of contacts 530 on the floor selector machine when one of the respective down landing call relays of FIG. 4 has been energized. If the car is set to travel downward contacts DF in line 65 of the down generator field relay DF are closed and contacts UF in line 63 of the up generator field relay UF are open isolating the stopping relay S from the up call contacts 520 and connecting the relay S with the down call column of contacts 530. Therefore, contact of brush 531 with an energized one of the column of contacts 530 will energize the landing signal stopping relay S in line 63 provided that the same circumstances are met as set forth above for energization of relay S and that one of the contacts STD to S2D has energized one of the contacts 530.

The lockout feature of this invention includes the barring of response of a car to landing calls for a floor which is locked out. Bypass relay BP at 48 provides this function since the effective presence of the car in the vicinity of a locked out floor energizes lockout relay LO to open its back contact LO at 48, deenergizing relay BP and opening its contact at 63, whereby all circuits for initiating energization of relay S are opened.

Figure 6:
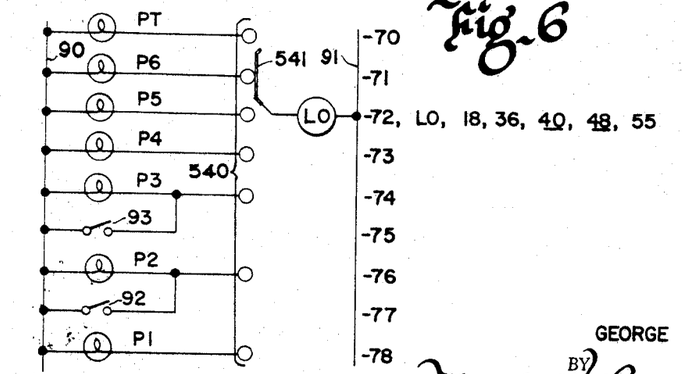
FIG. 6 is a position indicator circuit having a lockout circuit superimposed thereon for the second and third landings.

Description of FIG. 6

The car position indicator and floor lockout circuits are shown in FIG. 6.

A series of lamps indexed to car position are provided, usually in a display panel at the main landing and frequently at the controls in the elevator penthouse and in the elevator car to indicate the effective position of the car. These controls are ordinarily correlated with the slowdown distance required by being commutated from the floor selector crosshead and in advance of actual car position. Thus in the event the car travels at a speed requiring a floor height of travel to slowdown and stop following the pickup of a call requiring a stop, the position indicator is arranged to be actuated slightly in advance of that pickup of the call. This is accomplished by employing a brush 541 carried by crosshead 415 which spans the distance between normal landing positions on the floor selector 414 and therefore is engaged by floor contacts 540 in advance of the engagement of the call pickup brushes such as 433, 434, 521 and 531 and call reset brushes 431, 510 and 511 with their respective contacts for the corresponding floor on the floor selector 414.

As the car is advanced along its hatchway, the floor selector crosshead 415, in the illustrative type of control, preceeds the actual car position in its relative position on the floor selector contact array 414. The brush 541 preceeds the remaining brushes on the crosshead and this completes a circuit from leads 90 and 91 connected across a suitable source such as 10 volts alternating current through the position indicator lamp such as P6 for the sixth floor position, contact 540, brush 541 and the coil of relay LO. Thereafter the further advance of the crosshead 415 brings the other brushes into engagement with their respective contacts.

The position indicator circuit has been modified to provide a means for selectively operating relay LO to lockout service to predetermined landings. The ten volt source across leads 90 and 91, when employed with lamps drawing 0.17 amp at 10 volts and a relay having a coil rated at 0.65 ohm at 12 volts sixty cycle and a sealed current of 3.2 amperes, is insufficient to impose a pull-in voltage across the coil or to cause a pull-in current to flow through the coil because virtually all of the voltage drop occurs across the lamp filament and the filament resistance prevents a pull-in level of current from flowing. Conversely the presence of the relay coil in the lamp circuit has an inpreceptable effect upon the lamp in view of the relatively low resistance of the coil. Hence the position indicator circuit functions in a normal manner even though the coil is present.

Relay LO will operate when connected directly across leads 90 and 91. Thus the shunting of the position indicator lamp for a floor, as by switch 92 for the second floor connected across lamp P2 and switch 93 for the third floor connected across lamp P3, enables the relay LO to be pulled-in when brush 541 engages the second and third floor contacts 540.

When relay LO is pulled in, it locks out the floor to the elevator car by preventing normal stops at the landing for the floor and by maintaining the mechanical interlock for the landing doors for that floor. The mechanical interlock, as will be described with reference to FIGS. 7, 7A and 8, is maintained by holding retiring cam relay RC energized through contact LO at 18 while the crosshead 415 carries the various stop signal pickup brushes across the contacts for the locked out floor and while the car is stopped, as by emergency stopping controls in the vicinity of the landing. Normal car call stops are prevented by opening the back contact LO at 40 to the stopping sequence relay SC and landing call stops are prevented by deenergizing bypass relay BP at open back contact LO at 48. Car calls for the locked out landing are reset by closing contact LO at 36 and landing calls are reset by closing contact LO at 55 without setting the car to stop, as required in normal reset operations. In each of the circuits the functions at the landings for which switches have not been closed around the position indicator lamps remain unchanged since the lockout relay for the car is pulled-in only while the car is effectively in the vicinity of the locked out landing.

Advantageously the lockout switch can be key operated and can be wired into the system for a car at any location providing access to the leads to the position indicator lamps. Thus key operated switches such as 92 and 93 can be mounted in the indicator and control panel at the main landing immediately adjacent the indicator lamps or in the elevator car adjacent those lamps. No restrictions need be imposed on the arrangement of switches. That is, they can be provided for but one car at one floor, one car for all floors, one car for any number of floors, or in a multicar system for any number of cars and any number and combination of floors provided each car has the lockout relay circuit of FIG. 6 or its equivalent and corresponding individual car functions for the lockout relay LO.

Although the dual function commutating circuit has been illustrated for a modified position indicator circuit other commutated circuits arranged to respond prior to the initiation of a car stop can be utilized in its stead. The advancing type of crosshead is not the only form of commutating device to which the dual function can be applied, hence step-by-step commutating devices and systems for elevator controls can also be modified as in their position indicator circuits to afford the lockout of floors. Further while an electromagnetic relay type switch is employed to provide the lockout sensing and switching, it is to be understood that other switching means which are responsive to predetermined impedance levels can be substituted for the relay LO including circuits employing electron discharge devices such as high vacuum and gas tubes and solid state switching devices wherein the operation of an indicator is not significantly impaired by the presence of the switching means. Thus when the sensing control is commutated to a high impedance of a first level, it has no response, and when commutated to a lower impedance at a second lower level, it responds to make appropriate changes in the system. The threshold of operation of the secondary function can be designed to respond to less drastic circuit changes than short circuiting of an indicator lamp; for example, lamp operation can be retained at a lower level of brilliance by placing resistance in series with the shunting switches as 92 and 93 and if necessary employing a switching means having a more precisely established threshold of operation than an electro-magnetic relay to sense the presence or absence of the shunt in the indicator circuit.

Description of FIGS. 7, 7A and 8

The hardware for an elevator car door and a typical hatchway landing door with which it cooperates as viewed from the landing is shown in FIGS. 7A and 7. Those drawings are positioned in vertical alignment as the car would appear while above the landing. FIG. 8 is a side view of the retiring cam carried by the car and its cooperative cam follower for the hatchway door mechanical interlock as they appear with the car in the vicinity of the landing.

Elevator car 101 of FIG. 7A is guided according to usual practice by hatchway rails 102 running vertically along the sides of the hatchway and engaging guide shoes 103 attached to the frame supporting car 101. The car is supported by cables 104 running up the hatchway to drive equipment as represented in the schematic diagram of FIG. 1 by the cable 408.

The elevator car 101 is equipped with a door operating mechanism that includes a pivoted lever 106 connected through a link 107 to a first door 108 and through a second link 109 to a second door 110. Since the distance from the fulcrum of the lever 106 to the links 107 and 109 is different, the travel of the doors 108 and 110 is also different. This allows the doors to overlap each other in the open position and to close in slightly overlapping position to close the entire entryway of elevator car 101. The fast moving car door 110 carries a clutch including a pair of rollers 111 positioned to embrace vertically extending vanes 112 on each of the hatchway landing doors 113 of the form shown in FIG. 7 with which the car can be brought into registry when that car is in registry with the door. Only one landing door 113 is shown for simplicity of illustration, it being understood that there is a plurality of landing doors 113 and a plurality of vanes 112 which are embraced by the clutch 111 during the travel of the elevator car. Whenever the elevator car reaches a hatchway entrance from either direction of travel and a mechanical interlock 115 for the hatchway door is unlocked as hereinafter described, movement of the fast moving car door 110 actuates the lever 183 causing the rollers of clutch 111 to embrace the vane 112 on the landing door 113 so that as the car door is moved to the left, the landing door is similarly moved as viewed in FIGS. 7 and 7A.

The elevator car 101 is equipped with a retiring cam 116 as shown in detail in FIG. 8 which is so oriented on the car that it is in alignment with a cam follower 117 on an arm 118 secured to a rock shaft 119 that is rotatably mounted in the landing door interlock 115. The retiring cam 116, when extended and while the car is in the vicinity of the landing, displaces the cam follower 117 as shown in dotted lines in FIG. 8 to release a latch which otherwise retains the link 130 in the position illustrated in FIG. 7 whereby that link can be advanced upwardly permitting the link 122 to move upwardly as the link 123 coupled to the hatchway doors through link 124 is moved to the left. In the absence of the release of the latch engaging link 130, the landing doors 113 cannot be moved to the left without breaking the linkage 122, 123, 124 and 125.

In accordance with the present invention, the retiring cam 116 is retained in its retracted position shown in solid lines in FIG. 8 such that the latch of landing door interlock 115 is not released even though the car is in the vicinity of a locked out landing and even though under normal circumstances the retiring cam would be extended by virtue of the maintenance of retiring cam relay RC in its energized state to maintain closed the contact RC in FIG. 8 whereby power from the source 131 is supplied to the retiring cam solenoid 132 to retain the clamper 134 in the retiring cam linkage against the magnetic core 133 for solenoid 132.

The retiring cam linkage comprises a pair of pivot points 142 mounted upon the elevator car and rotatably supporting bell cranks 141 one end of which is pivoted to the rear face of the retiring cam and the other end of which is pivoted to a lever 140 to which a counterweight 139 is secured. The upper end of lever 140 is pivotally connected to a lever 136 which is pivotally mounted on the car at 137 and is coupled to a link 135 to clamper 134. So long as the clamper 134 is retained against the core 133 the lever 136 is maintained in the position shown and the retiring cam is retracted. However, upon deenergization of solenoid 132, counterweight 139 overcomes the weight of the retiring cam 116 causing the bell cranks 141 to rotate in a clockwise direction about their pivots 142 while the lever 136 rotates in a counterclockwise direction about the pivot 137 to extend the retiring cam to the position shown in dotted lines in FIG. 8. When thus extended, the retiring cam displaces the cam follower 117 also as shown in dotted lines to release the landing door interlock.

Under emergency stopping conditions the elevator car brake is set and brake relay contact BK at line 20 opens. In the absence of the operation of the lockout relay LO to close contact LO at 18, retiring cam relay RC would drop deenergizing retiring cam solenoid 132 and permitting the retiring cam to be extended. However, in accordance with the present invention, the lockout relay maintains the retiring cam relay energized so long as the elevator car is effectively in the vicinity of a landing for a floor which has been locked out thereby maintaining the retiring cam in its retired position and preventing the release of the latch for the landing door. In this manner the landing is not only locked against the normal control responses instituted by the registration of calls, but also against the unauthorized stops afforded by operation of emergency controls in the elevator coupled with the landing door interlock latch 115 in the latched condition, the landing doors cannot be forced open manually and the security at the floor is maintained.

It is to be appreciated that the preceding disclosure is presented merely for purposes of illustrating the invention and is not to be read in a restricting sense. It is evident from the above discussion that many variations in the specific equipment utilized to provide combinations performing the functions of this invention suggest many alternative types of equipment and accordingly this invention is not to be read as restricted to the specific disclosure.

Having described the invention, I claim:

1. An elevator control for a car serving a plurality of landings and selectively actuated when said car is effectively at an individual landing, comprising a plurality of first circuits each correlated to a given one of said landings, each of said circuits having an impedance within a first range of values, second circuit means setable for selectively altering the empedance of said first circuit for said individual landing to a second range of impedance values, said second circuit means being electrically independent of said first circuits for landings other than said individual landing, sensing means ron-responsive to said first range of impedance values and responsive to said second range of impedance values, and commutating means for connecting said sensing means in a completed circuit through each of said first circuits in accordance with the effective position of said car, whereby said sensing means is responsive when said car is effectively at said individual landing and said second circuit means is set to alter the impedance value to said second range of values.

2. A combination according to claim 1 wherein said first circuits are car position indicators.

3. A combination according to claim 1 wherein said means for selectively altering impedance is a shunt circuit selectively connected across a first circuit.

4. A combination according to claim 1 wherein said sensing means is a relay.

5. A combination according to claim 1 wherein said commutating means includes a common circuit to which said sensing means is connected and means to selectively connect said common circuit to individual first circuits.

6. An elevator control for a car serving a plurality of landings and selectively actuated when said car is effectively at an individual landing, comprising a plurality of car position indicator circuits each correlated to a given one of said landings and each having an impedance in a first range, a shunt selectively connected across said indicator circuit for said individual landing, said shunt being electrically independent of said position indicator circuits for landings other than said individual landing, a relay, and a commutating means including a common circuit to which said relay is connected and means to selectively connect said common circuit to individual car position indicator circuits, said relay when commutated to individual car position indicator circuits being non-responsive to individual circuits having said first range of impedances and being responsive to said circuit of said individual landing, having said shunt connected thereacross.

7. A combination according to claim 1 including means to register calls for said landings, means to stop the car at landings in response to calls therefor, and lockout control means responsive to said sensing means to prevent the stopping of said car at landings in response to said stop means, whereby said car is prevented from stopping at said individual landing for which said first circuit impedance is altered in response to calls therefor.

8. A combination according to claim 7 including means to cancel registered calls in response to said actuated lockout controls, whereby a call for said individual landing for which said first circuit impedance is altered is cancelled without stopping said car at said landing.

9. A combination according to claim 1 including means to stop said car, a landing door for each of said landings, means to mechanically lock said doors in their closed positions, means to release said lock means for a door when said car is stopped in the vicinity of said door, and lockout controls which maintain said mechanical lock in its locked condition for said door at said individual landing for which said first circuit impedance is altered when said car is stopped in the vicinity of said landing, whereby access to said individual landing from said car is prevented when said sensing means is responsive to said second range of impedance values.

10. An elevator control for an elevator car serving a plurality of landings comprising means to register calls individual to each of said landings, means to stop said car at a landing for which a call is registered by said call registering means, a lockout control for preventing the stop of said car at a landing for which a call is registered by said call registering means, and means for selectively actuating said lockout control in response to the presence of said car in the vicinity of a predetermined landing, whereby access from said car to said predetermined landing is prevented by the actuation of said lockout control while said elevator continues to stop in response to said stop means and provide access to other landings.

11. An elevator control for an elevator car serving a plurality of landings comprising means to register calls individual to each of said landings, means to stop said car at a landing for which a call is registered by said call registering means, means to reset a call registering means, a lockout control for preventing the stop of said car at a landing for which a call is registered by said call registering means and for actuating said call resetting means for a landing in the vicinity of said car, and means for selectively actuating said lockout control in response to the presence of said car in the vicinity of a predetermined landing, whereby access from said car to said predetermined landing is prevented by the actuation of said lockout control while said elevator continues to stop in response to said stop means and provide access to other landings.

References Cited

UNITED STATES PATENTS

| | | | |
|---|---|---|---|
| 2,827,981 | 3/1958 | Eames et al | 187—29 |
| 3,297,109 | 1/1967 | Magee | 187—29 |
| 3,388,376 | 6/1968 | Magee | 340—20 |

ORIS L. RADER, *Primary Examiner.*

THOMAS E. LYNCH, *Assistant Examiner.*